(12) United States Patent
Hildebrandt

(10) Patent No.: US 9,050,702 B2
(45) Date of Patent: Jun. 9, 2015

(54) FINISHING DEVICE FOR FINISH-MACHINING OF A WORKPIECE

(71) Applicant: Supfina Grieshaber GmbH & Co. KG, Wolfach (DE)

(72) Inventor: Oliver Hildebrandt, Hornberg (DE)

(73) Assignee: SUPFINA GRIESHABER GMBH & CO. KG, Wolfach (DE)

( * ) Notice: Subject to any disclaimer, the term of this patent is extended or adjusted under 35 U.S.C. 154(b) by 207 days.

(21) Appl. No.: 13/737,520

(22) Filed: Jan. 9, 2013

(65) Prior Publication Data

US 2013/0189910 A1    Jul. 25, 2013

(30) Foreign Application Priority Data

Jan. 23, 2012    (EP) .................................... 12152052

(51) Int. Cl.

| | |
|---|---|
| B24B 49/16 | (2006.01) |
| B24B 5/42 | (2006.01) |
| B24B 21/02 | (2006.01) |
| B24B 35/00 | (2006.01) |
| B24B 49/10 | (2006.01) |
| G01B 7/16 | (2006.01) |
| B23Q 17/09 | (2006.01) |

(52) U.S. Cl.
CPC ................. *B24B 49/16* (2013.01); *B24B 21/02* (2013.01); *B24B 35/00* (2013.01); *B24B 49/10* (2013.01); *B24B 5/42* (2013.01); *G01B 7/16* (2013.01); *B23Q 17/0966* (2013.01)

(58) Field of Classification Search
CPC .................................. B24B 49/16; B24B 5/42
USPC ........... 451/317, 312, 313, 324, 49, 173, 168, 451/5, 8, 9, 10
See application file for complete search history.

(56) References Cited

U.S. PATENT DOCUMENTS

| | | | | | |
|---|---|---|---|---|---|
| 4,873,792 | A | * | 10/1989 | Linke et al. ..................... | 451/14 |
| 5,447,463 | A | * | 9/1995 | Schmitz .......................... | 451/14 |
| 5,683,291 | A | * | 11/1997 | Humpert et al. ............... | 451/168 |
| 5,803,796 | A | * | 9/1998 | Barton, II ...................... | 451/168 |
| 5,857,895 | A | * | 1/1999 | Falchieri ......................... | 451/8 |
| 6,095,909 | A | * | 8/2000 | Chenu ............................ | 451/302 |
| 2002/0146962 | A1 | | 10/2002 | Huang | |

FOREIGN PATENT DOCUMENTS

| | | |
|---|---|---|
| DE | 43 30 808 | 3/1995 |
| DE | 196 07 778 | 9/1997 |
| DE | 199 54 519 | 5/2001 |
| EP | 0 459 948 | 12/1991 |
| EP | 1 518 643 | 3/2005 |
| JP | 11-90822 | 4/1999 |

OTHER PUBLICATIONS

European Search Report dated Jul. 25, 2012, and Translation thereof.

* cited by examiner

*Primary Examiner* — Robert Rose
(74) *Attorney, Agent, or Firm* — Henry M. Feiereisen LLC.

(57) ABSTRACT

A finishing device for finish-machining of a workpiece includes a force-generating device for generating a driving force, a force-transmitting arm and a pressing device for applying a working force to a finishing tool, and further a measuring device for measuring a deformation of a segment of the force-transmitting arm arranged in the force flux between the driving force and working force and/or for measuring a deformation force applied in the segment.

9 Claims, 3 Drawing Sheets

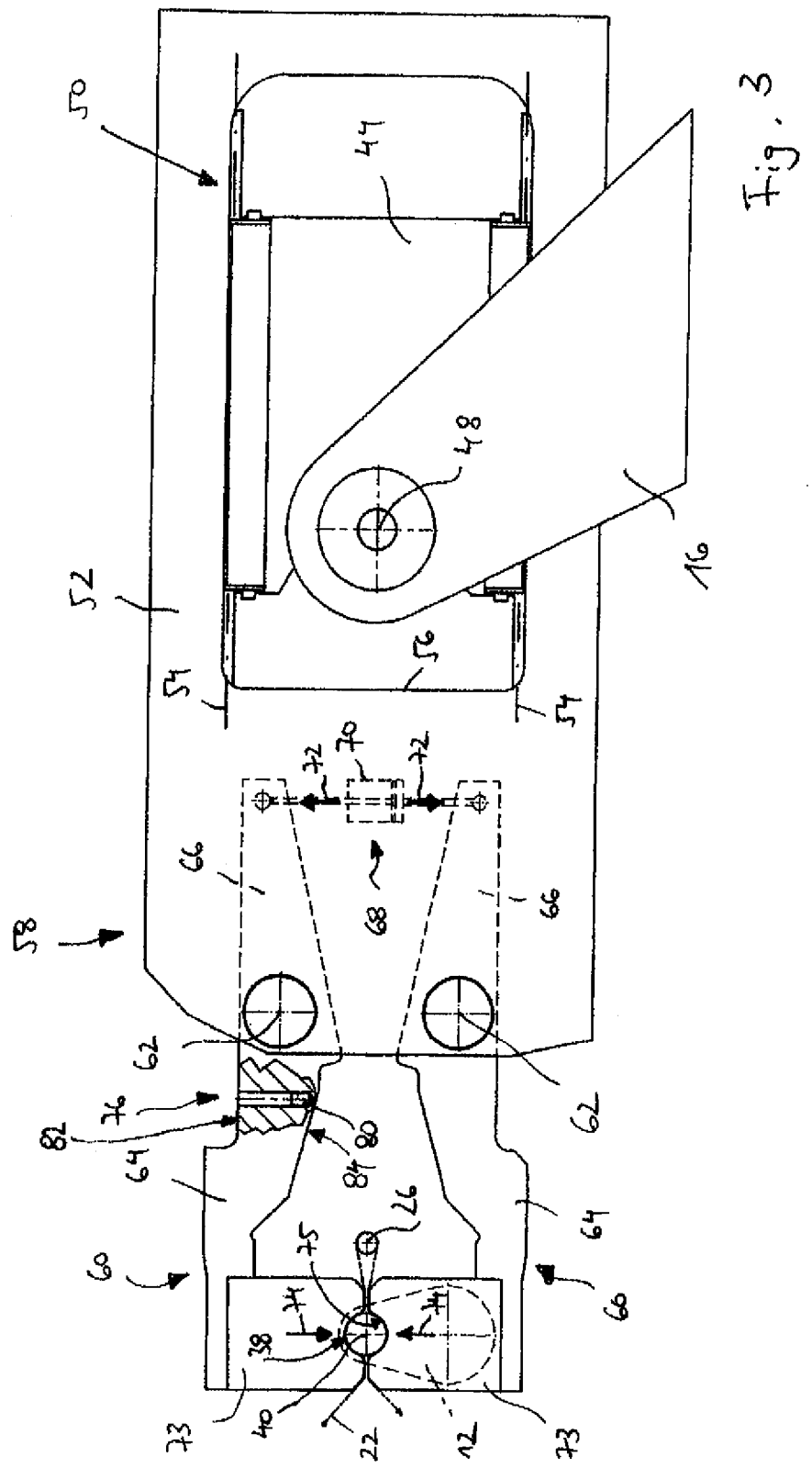

FINISHING DEVICE FOR FINISH-MACHINING OF A WORKPIECE

CROSS-REFERENCES TO RELATED APPLICATIONS

This application claims the priority of European Patent Application, Serial No. 12 152 052.2, filed Jan. 23, 2012, pursuant to 35 U.S.C. 119(a)-(d), the content of which is incorporated herein by reference in its entirety as if fully set forth herein.

BACKGROUND OF THE INVENTION

The invention relates to a finishing device for finish-machining of a workpiece.

Finish-machining of a workpiece is a method for machining the surface of a workpiece, also referred to as "superfinishing" or "very-fine-machining process". In this process, an abrading finishing tool, for example a finishing stone or a finishing belt, is pressed against the workpiece surface to be machined. The workpiece surface to be machined hereby rotates. Preferably, an oscillatory motion is superimposed on the rotation of the workpiece surface to be machined, wherein the finishing tool and the workpiece surface move relative to one another in directions that are parallel or inclined to the rotation axis.

The complexity of the different movements of the workpiece to be machined and/or of the finishing tool can cause malfunctions even when a finishing device is carefully set up and operated, for example due to blockage of the force-generating device or due to a collision between a protrusion from the workpiece and from parts of the finishing device.

It would therefore be desirable and advantageous to obviate prior art shortcomings and to provide an improved finishing device for easily and quickly detecting mechanical malfunctions that may occur during the finish-machining of a workpiece in a finishing device.

SUMMARY OF THE INVENTION

According to one aspect of the present invention, a. finishing device for finish-machining of a workpiece includes a force-generating device for generating a driving force, a force-transmitting arm, a pressing device for applying a working force to a finishing tool, and a measuring device for measuring a deformation of a segment of the force-transmitting arm arranged in a force flux between the driving force and the working force or for measuring a deformation force applied in the segment of the force-transmitting arm, or both.

In the finishing device according to the invention, a substantially rigid component, which transmits a driving force and converts the driving force into a working force, is used in conjunction with a measuring device for measuring a deformation and/or a force causing the deformation. By measuring at least one of the aforementioned quantities, mechanical malfunctions of the finishing device can be detected, particularly in a region located proximate to the effective location of the finishing tool and of the workpiece surface to be machined.

For example, the measuring device can be used to detect a malfunction of the force-generating device. Such a malfunction may be caused, for example, when an inadequate driving force or of a driving force having excessive variations is generated, which then results in an extremely high or a strongly varying working force. Such undesirable deviation of the working force from a desired working force affects the accuracies that can be achieved during finish-machining of the workpiece surface. The finishing device according to the invention therefore enables, in addition to the detection of mechanical malfunctions of the finishing device, also the detection of a deviation from a desired process quality.

Within the context of the present invention, the term "segment of the force-transmitting arm" located in the force flux between the driving force and the working force refers to material segments where deformations and/or forces causing these deformations which are caused by introduction of the driving force and the recovery of the working force can be measured. These segments may be material segments having an outer surface and/or material segments located "in the interior", i.e. segments that do not have an outer surface.

The finishing device according to the invention is in principle suitable to apply any load to the force-transmitting arm. Mechanical malfunctions can be measured particularly reliably when the force-transmitting arm is subjected to bending due to the introduction of the driving force and of a counter-force from the workpiece operating on the pressing device by way of the finishing tool. Such bending introduces easily detectable deformations, in particular on the outer surfaces of the force-transmitting arm.

The finishing device according to the invention can also be used in situations where the force-transmitting arm experiences torsion caused by a friction force acting on the pressing device and generated by the workpiece when the workpiece is driven along an oscillation axis in an oscillatory fashion. Under this type of load, which may be present in addition or alternatively to the aforedescribed bending load, deformations in particular on the outer surfaces of the force-transmitting arm can also be easily measured.

According to an advantageous feature of the present invention, the deformation measured by the measuring device may be an elongation and/or a compression. In this way, comparatively simple sensors may be used, as will be described later.

For a simple conversion of the driving force into a working force, the force-transmitting arm may be pivotally supported about a swivel axis.

According to another advantageous feature of the present invention, the driving force and the working force may operate on segments of the force-transmitting arm that face away from one another with respect to the swivel axis. In this way, a force-generating device may be provided in a finishing device having two opposing force-transmitting arms which generates driving pressure forces in opposite directions which are then converted into working forces that are aligned with each other.

According to another advantageous feature of the present invention, the measuring device may be arranged between a region where the working force is effective and the swivel axis. With this arrangement, the installation space available for the force-generating device is fully conserved. In addition, deformations and/or deformation forces may be measured in a region where relatively high deformations and/or deformation forces occur.

The measuring device may be, for example, a surface strain gauge. Such surface strain gauge is commercially available, for example, from the company Kistler Instruments AG, Winterthur, Switzerland, for example with the type designation "9232A . . . ". This type of gauge is comparatively robust and allows a simple measurement of an elongation or compression on an outer surface of the force-transmitting arm.

Alternatively or in addition, the measuring device may also include a transverse measuring dowel. With such transverse measuring dowel, the deformation is measured in an interior region of the force-transmitting arm. For example, a quartz transverse measuring dowel of the type "9241C..." from the company Kistler may be used.

According to another advantageous feature of the present invention, the pressing device may be connected with a finishing tool embodied as a finishing stone. In this case, the working force of the pressing device is transferred to the finishing stone which then finish-machines with an active area a workpiece surface.

In an alternative embodiment, the pressing device may advantageously have a pressing surface for pressing against a finishing tool embodied as a finishing belt. In this case, the working force is applied to the finishing belt, which then transfers the working force to the workpiece surface to be machined.

BRIEF DESCRIPTION OF THE DRAWING

Other features and advantages of the present invention will be more readily apparent upon reading the following description of currently preferred exemplified embodiments of the invention with reference to the accompanying drawing, which show in:

FIG. 3 a side view of another embodiment of a finishing device for finish-machining of a workpiece corresponding to FIG. 2.

DETAILED DESCRIPTION OF PREFERRED EMBODIMENTS

Figure 1:
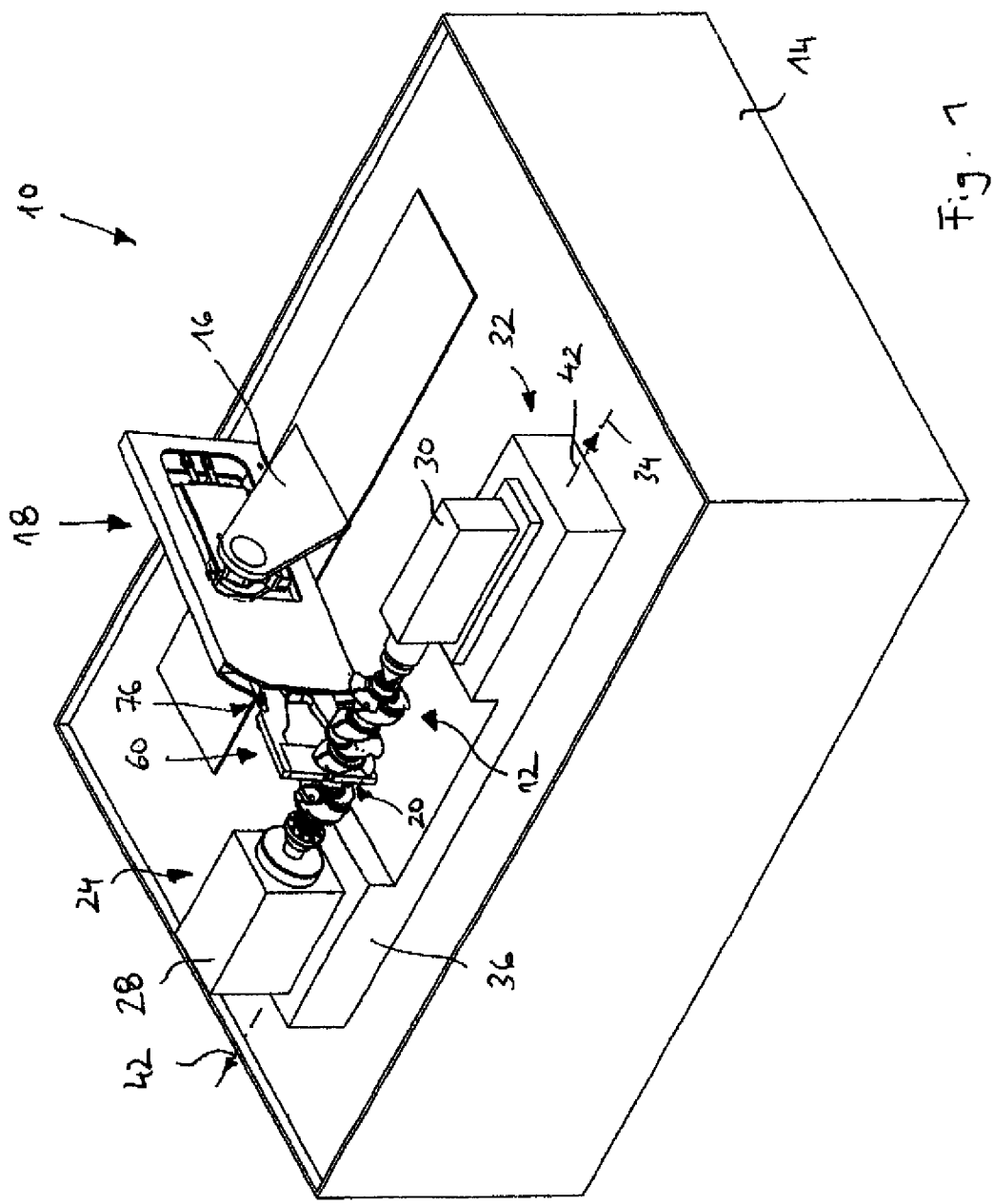
FIG. 1 a perspective diagram of an embodiment of a finishing device for finish-machining of a workpiece according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an embodiment of a finishing device having the overall reference symbol 10 is intended for finish-machining of a workpiece 12. The finishing device 10 includes a stationary frame 14 with a frame part 16 for connecting a later described support device 18 to the frame 14. The support device 18 is intended for supporting a pressing device 20 on the frame 14, as will be described in more detail below. The pressing device 20 presses a finishing tool 22 (see FIG. 2), for example embodied as a finishing belt, against a surface of the workpiece 12 to be finish-machined.

Figure 2:
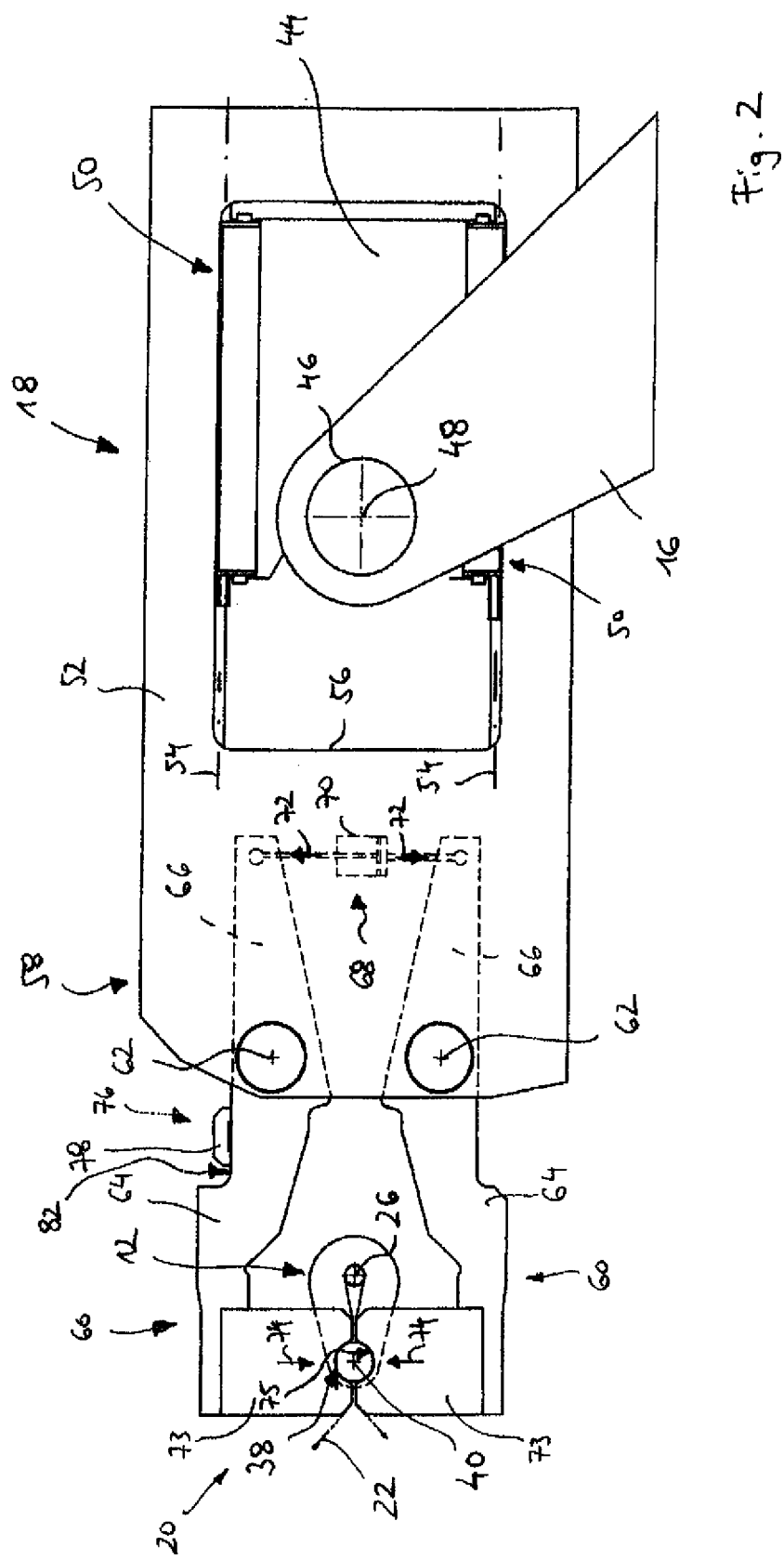
FIG. 2 a side view of a detail of the finishing device according to FIG. 1.

The finishing device 10 includes a rotary drive device 24 (see FIG. 1) for rotating the workpiece 12 about a workpiece axis 26 (see FIG. 2). The rotary drive device 24 includes a headstock 28 and a tailstock 30. The workpiece 12 is clamped between the headstock 28 and the tailstock 30. The assembly composed of the rotary drive device 24 and the workpiece 12 can be moved back and forth with a short stroke by way of an oscillatory drive 32 along an oscillation axis 34 that is parallel to the workpiece axis 26.

Advantageously, the oscillatory drive 32 includes a carrier 36 for mounting the headstock 28 and the tailstock 30. The carrier 36 is driven by a conventional driving device, for example an eccentric drive, which will not be described in detail.

The workpiece 12 has a peripheral workpiece surface 38 which is eccentrically offset in relation to the workpiece axis 26. More particularly, the peripheral workpiece surface 38 extends concentrically about an auxiliary axis 40, which extends parallel to and is spaced from the workpiece axis 26.

More particularly, the workpiece 12 is a crankshaft. The peripheral workpiece surface 38 is in particular the bearing face of a pin bearing of the crankshaft.

When the workpiece 12 is machined, the workpiece 12 rotates about the workpiece axis 26. The peripheral workpiece surface 38 moves commensurate with the spacing between the axes 40 and 26 in a circular orbit about the workpiece axis 26. An oscillatory motion indicated in FIG. 1 with a double arrow 42 is superimposed by the oscillatory drive 32 on the aforedescribed rotary motion so as to apply a cross-hatched finish to the peripheral workpiece surface 38 by way of the abrasive effect of the finishing tool 22.

Because the peripheral workpiece surface 38 moves, as described above, in a circle about the workpiece axis 26, the finishing tool 22 and hence the pressing device 20 must also be able to follow this motion of the peripheral workpiece surface 38. Therefore, the support device 18 for supporting the pressing device 20 on the frame 14 has two degrees of freedom, thereby allowing the pressing device 20 to move in a plane perpendicular to the workpiece axis 26.

The support device 18 includes a swivel member 44 which is held on the frame part 16 by a swivel bearing 46 for pivoting about a swivel axis 48. The swivel axis 48 extends parallel to the workpiece axis 26.

The swivel member 44 is used for mounting at least one linear guide 50, with which a bearing member 52 is supported for motion relative to the swivel member 44 along a guide axis 54 of the linear guide 50.

The bearing member 52 extends substantially within a plane extending perpendicular to the workpiece axis 26. The bearing member 52 includes an opening 56 through which the swivel bearing 46 extends.

The bearing member 52 has a bearing member end 58 facing the workpiece 26 for arranging at least one force-transmitting arm 60, preferably for arranging two force-transmitting arms 60.

The force-transmitting arms 60 can be pivoted relative to the bearing member 52 about corresponding swivel axes 62. More particularly, the swivel axes 62 extend parallel to the swivel axis 48 of the swivel member 44.

The force-transmitting arms 60 have a first segment 64 extending between the pressing device 20 and the swivel axis 62. The force-transmitting arms 60 have additionally a second segment 66 extending between the swivel axis 62 and a force-generating device 68.

The force-generating device 68 is constructed, for example, in form of a hydraulic unit 70 which applies driving forces 72 to the second segment 66 of the force-transmitting arms 60.

The pressing device 20 includes at least one pressing element 73 associated with a corresponding force-transmitting arm 60, preferably two pressing elements 73 which are each associated with a corresponding force-transmitting arm 60 and which each have a pressing surface 75. The pressing surfaces 75 are more particularly constructed in form of a shell, so that a finishing tool 22 embodied as a finishing belt can be pressed against the peripheral workpiece surface 38 along a portion of the periphery of the peripheral workpiece surface 38.

The pressing device 20 and the force-generating device 68 are arranged in relation to the swivel axes 64 on opposite sides of the pressing elements 60. Opposing driving forces 72 can thus be converted into aligned working forces 74.

Due to the working forces 74 exerted by the pressing device 20 on the workpiece 12, opposing counter forces from the workpiece 12 act on the pressing device 20. These counter forces are substantially parallel to the driving forces 72 and operate in relation to the swivel axis 62 on opposite segments 64 and 66 of the force-transmitting arms 60. The force-transmitting arms 60 are then subjected to a bending load.

As a result of the oscillation of the workpiece 12 along the oscillation axis 42, friction forces are effective between the peripheral workpiece surface 38 and the finishing tool 22, which are transferred to the pressing device 20 and hence also to the force-transmitting arms 60. The force-transmitting arms 60 are then subjected to transverse forces in a direction parallel to the oscillation axis 42. A torsion load is thus superimposed on the bending load of the force-transmitting arms 60.

For measuring a deformation of at least one of the force-transmitting arms 60, a measuring device 76 is provided which is connected with at least one force-transmitting arm 60. The measuring device 76 is, for example, a surface strain gauge 78 (see FIG. 2) or a transverse measuring dowel 80 (see FIG. 3).

The measuring device 76 is preferably arranged in the region of the force-transmitting arm 60 where the largest possible deformations occur due to the forces operating on the force-transmitting arm 60. Due to the bending stress of the force-transmitting arm 60 caused by the counter forces from the workpiece 12 on the pressing device 20 and due to the driving forces 72, the force-transmitting arm 60 is maximally compressed in a central region of the force-transmitting arm 60 (as viewed along the longitudinal extent of the force-transmitting arm), more specifically on a outside 82 of the force-transmitting arm 60 that faces away from the workpiece 12 (see FIG. 2).

A maximum elongation of the force-transmitting arm 60 also occurs in a central region of the force-transmitting arm 60, however this time on an inside 84 of the force-transmitting arm 60 facing the workpiece 12 (see FIG. 3). For this reason, surface strain gauges 78 are preferably positioned on or adjacent to the outside 82 and/or the inside 84 of the force-transmitting arm 60.

When using transverse measuring dowels 80, these are preferably arranged inside the material of the force-transmitting arm, in particular adjacent to an outside 82 and/or an inside 84 of a force-transmitting arm 60.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A finishing device for finish-machining of a workpiece, comprising:
   a force-generating device for generating a driving force,
   a force-transmitting arm supported for pivoting about a swivel axis,
   a pressing device for applying a working force to a finishing tool, and
   a measuring device arranged between a region, where the working force is applied, and the swivel axis for measuring a deformation of a segment of the force-transmitting arm arranged in a load path between the driving force and the working force or for measuring a deformation force applied in the segment of the force-transmitting arm, or both.

2. The finishing device of claim 1, wherein the driving force and an opposing force from the workpiece acting on the pressing device by way of the finishing tool cause bending of the force-transmitting arm.

3. The finishing device of claim 1, wherein a friction force acting on the pressing device and generated by the workpiece which is driven in an oscillating manner along or about an oscillation axis cause torsion of the force-transmitting arm.

4. The finishing device of claim 1, wherein the deformation is equivalent to an elongation or a compression.

5. A finishing device, for finish-machining of a workpiece, comprising:
   a force-generating device for generating a driving force,
   a force-transmitting arm supported for pivoting about a swivel axis,
   a pressing device for applying a working force to a finishing tool, and
   a measuring device for measuring a deformation of segments of the force-transmitting arm arranged in a load path between the driving force and the working force or for measuring a deformation force applied in the segment of the force-transmitting arm, or both,
   wherein the driving force and the working force operate on the segments of the force-transmitting arm that face away from each other in relation to the swivel axis.

6. The finishing device of claim 1, wherein the measuring device comprises a surface strain gauge.

7. A finishing device, for finish-machining of a workpiece, comprising:
   a force-generating device for generating a driving force,
   a force-transmitting arm,
   a pressing device for applying a working force to a finishing tool, and
   a measuring device for measuring a deformation of a segment of the force-transmitting arm arranged in a load path between the driving force and the working force or for measuring a deformation force applied in the segment of the force-transmitting arm, or both, wherein the measuring device comprises a transverse measuring dowel.

8. The finishing device of claim 1, wherein the pressing device is connected to the finishing tool which is constructed as a finishing stone.

9. The finishing device of claim 1, wherein the pressing device comprises a pressing surface pressing against the finishing tool which is constructed as a finishing belt.

* * * * *